(12) United States Patent
Ghosh

(10) Patent No.: US 10,156,315 B2
(45) Date of Patent: Dec. 18, 2018

(54) CORROSION RESISTANT BURIED UNDERGROUND DUCTILE CAST IRON PIPING MEMBERS WITH AN IMPROVED EXTERNAL COATING AND THE METHOD THEREOF

(71) Applicant: ELECTROSTEEL CASTINGS LIMITED, West Bengal (IN)

(72) Inventor: Abhijit Ghosh, West Bengal (IN)

(73) Assignee: ELECTROSTEEL CASTINGS LIMITED, West Bengal (IN)

( * ) Notice: Subject to any disclaimer, the term of this patent is extended or adjusted under 35 U.S.C. 154(b) by 0 days.

(21) Appl. No.: 15/577,111

(22) PCT Filed: Apr. 22, 2016

(86) PCT No.: PCT/IN2016/000104
§ 371 (c)(1),
(2) Date: Nov. 27, 2017

(87) PCT Pub. No.: WO2016/189544
PCT Pub. Date: Dec. 1, 2016

(65) Prior Publication Data
US 2018/0180215 A1    Jun. 28, 2018

(30) Foreign Application Priority Data
May 28, 2015  (IN) .............................. 595/KOL/2015

(51) Int. Cl.
*F16L 58/04* (2006.01)
*B32B 1/00* (2006.01)
(Continued)

(52) U.S. Cl.
CPC ................ *F16L 58/04* (2013.01); *B32B 1/00* (2013.01); *B32B 1/08* (2013.01); *B32B 15/013* (2013.01);
(Continued)

(58) Field of Classification Search
CPC ... F16L 58/04; F16L 58/08; F16L 9/02; C22C 18/04; C23C 4/08; C23C 4/131; B32B 15/013; B32B 15/18; B32B 1/08
See application file for complete search history.

(56) References Cited

U.S. PATENT DOCUMENTS 5,518,793 A    5/1996  Pedeutour et al.
5,706,866 A    1/1998  Pedeutour et al.

FOREIGN PATENT DOCUMENTS

| EP | 0 771 885 A1 | 5/1997 |
| WO | 94/19640 A1 | 9/1994 |
| WO | 95/04239 A1 | 2/1995 |

OTHER PUBLICATIONS

PCT/ISA/210, "International Search Report for PCT/IN2016/000104", dated Sep. 9, 2016.
(Continued)

*Primary Examiner* — Michael C Miggins
(74) *Attorney, Agent, or Firm* — Manabu Kanesaka

(57) ABSTRACT

The present invention relates to improvement of the outside anticorrosive treatment of ductile cast iron piping members, through the development of a Pseudo Alloy metallic film along with modified paint on the external surface, more particularly the present disclosure relates to the improved corrosion resistant to ductile cast iron piping members, specially when used in buried condition, the coating method that can form an anticorrosion pseudo metal alloy layer in the peripheral surface along with a modified Cashew Nut Shell Liquid (CNSL) paint.

24 Claims, 1 Drawing Sheet
(1 of 1 Drawing Sheet(s) Filed in Color)

(a): BITUMEN PAINT 500Hrs.SALTSPRAY (b): CNSL BASED PAINT; 500Hrs.SALTSPRAY

(51) Int. Cl.
 *C22C 18/04* (2006.01)
 *C23F 13/08* (2006.01)
 *C23F 13/14* (2006.01)
 *C23C 4/08* (2016.01)
 *C22C 37/00* (2006.01)
 *C22C 38/00* (2006.01)
 *C23C 4/131* (2016.01)
 *B32B 1/08* (2006.01)
 *B32B 15/01* (2006.01)
 *B32B 15/18* (2006.01)
 *F16L 58/08* (2006.01)
 *F16L 9/02* (2006.01)

(52) U.S. Cl.
 CPC .............. *B32B 15/18* (2013.01); *C22C 18/04* (2013.01); *C22C 37/00* (2013.01); *C22C 38/00* (2013.01); *C23C 4/08* (2013.01); *C23C 4/131* (2016.01); *C23F 13/08* (2013.01); *C23F 13/14* (2013.01); *F16L 58/08* (2013.01); *C23F 2213/32* (2013.01); *F16L 9/02* (2013.01)

(56) References Cited

OTHER PUBLICATIONS

PCT/ISA/237, "Written Opinion of the International Searching Authority for PCT/IN2016/000104" dated Sep. 9, 2016.

(a): BITUMEN PAINT 500Hrs.SALTSPRAY
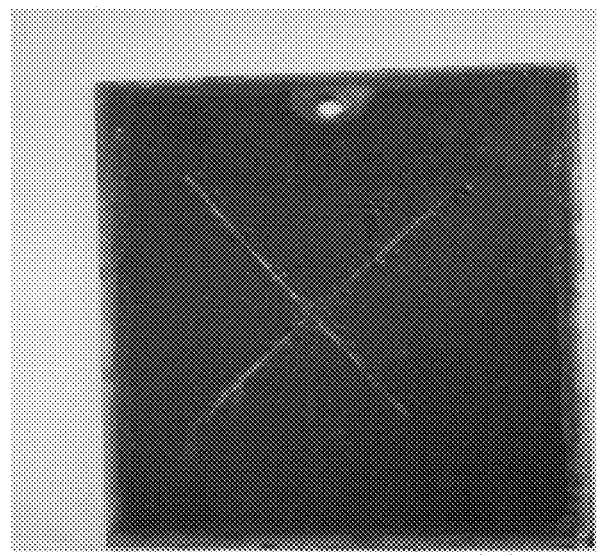
(b): CNSL BASED PAINT; 500Hrs.SALTSPRAY

CORROSION RESISTANT BURIED UNDERGROUND DUCTILE CAST IRON PIPING MEMBERS WITH AN IMPROVED EXTERNAL COATING AND THE METHOD THEREOF

RELATED APPLICATIONS

The present application is National Phase of International Application No. PCT/IN2016/000104 filed Apr. 22, 2016, and claims priority from Indian Application No. 595/KOL/2015, filed May 28, 2015, the disclosure of which is hereby incorporated by reference herein in its entirety.

FIELD OF THE INVENTION

This invention relates to improvement of the outside anticorrosive treatment of ductile cast iron piping members, through the development of a Pseudo Alloy metallic film along with CNSL (Cashew Nut Shell Liquid) modified paint on the external surface. More particularly the present disclosure relates to the improved corrosion resistant to ductile cast iron piping members, specially when used in buried condition, the coating method that can form an anticorrosion pseudo metal alloy layer in the peripheral surface along with a modified Cashew Nut Shell Liquid (CNSL) paint. Reference is made to the co-pending Patent Application No. 589/KOL/2015.

DESCRIPTION OF THE PRIOR ART

The corrosivity of iron in soil environment is a special phenomenon, which differs in nature from the corrosive behavior of iron exposed to open atmosphere. The corrosivity of soil varies depending upon the state of the formation of soil. The resistivity, salinity, microbial content in the soil imparts variable corrosion potential. The soils are categorized as non-corrosive, mildly corrosive, corrosive, aggressive soil. The iron materials buried in the soil is continuously under corrosion attack resulting in the formation of pittings on the pipe metal wall with gradual loss and disintegration of iron materials as Iron oxide, Iron hydroxide, Iron sulphide etc. The corrosion mechanism is further complicated by the fact that the soils are heterogeneous and very diverse in nature. Therefore, there is a need for the protection of buried iron pipes and this need is satisfactorily fulfilled by the Pseudo Alloy metallic film coating on the exterior of the piping members.

The development of special sacrificial anodic coating to protect the substrate from corrosion is possible. A coating with an alloy of metallic Zinc and Aluminium performs excellently for corrosion resistance. Further, ease in procurement of materials, and the ease of spraying through proper facility makes the coating operation furthermore suitable for mass production.

Individually, both Zinc and Aluminium coatings have its own advantages and limitations for effective corrosion protection to the iron substrate, ease in application coupled with optimum corrosion protection ability are the factors that restrict the use of Zinc or Aluminium individually. Although, Zinc is used individually for general corrosion protection, Aluminium is not used individually. The coating with an alloy of Zinc and Aluminium overcomes the above limitation and the corrosion resistance is far more effective.

Several forms of Zinc-Aluminium thermal spray coatings have been developed. Controversy exists concerning the merits of the various Zinc Aluminium coatings combinations. Controversy also exists concerning the most favourable Zinc-aluminum coatings compositions. Presently most research in the area of thermally sprayed Zinc-aluminum coatings has been centered around an optimum wt % of Zinc and Aluminum composition catering to the various types of aggressive soils in contact with iron pipes.

A prior Indian patent no. 242339 (1152/KOL/2008 Dt. 1 Jul. 2008), file by us, discloses outside anticorrosive treatment of ductile cast iron piping members, through the development of a Pseudo Alloy metallic film on the external surface. The disclosure further states a coating method than can form an anticorrosion pseudo metal alloy layer in the peripheral surface and also to an arrangement to obtain uniform deposition of the pseudo alloy over the external surface of the piping member and the piping member produced by the disclosed method.

In another disclosure by Pedeutour et al in an US specification U.S. Pat. No. 5,706,866 discloses a cast iron piping system element has an outer coating comprising a first, inner porous layer consisting of Zinc/Aluminium alloy containing from 5 to 60% of Aluminium, and a second outer pore occluding layer of an organic or mineral binder in an aqueous, solvent or powder phase with a coating thickness of 100-140 micron. The alloy layer is meant to be of a quantity of at least 200 gms/m$^2$ In another prior art, a PCT publication WO2008033112 discloses polymer coatings containing phytochemical agents and methods for making and using same. The invention discloses compositions comprising a polymer base incorporating antifouling compositions suitable for use in aquaculture, marine and architectural systems as paints, structures or coatings.

External coating of Dl Piping member, with alloy of Zn and Al as a first layer followed by a second layer of paint as barrier coating, serves satisfactorily as cathodic protection to the piping member, even when laid underground in an aggressive soil. However, the Zn—Al coating quantity (in gms/m$^2$) and the ratio of Zn/Al may have to be optimized depending on the soil condition in which the Dl Piping member is laid.

Corrosion of the external surface of the ductile iron pipe members is dependent on the soil and ambient conditions of the areas around the pipe members. The resistivity of the soil, acidity/alkalinity, microbiological activity, ambient conditions, etc. affect the corrosion of the external surface of the ductile iron pipe members which is quite different from the general corrosion of the iron. The corrosion of the ductile iron pipe members results in formation of oxides, hydroxides, sulphides, chlorides, etc. which results in the disintegration of the ductile iron pipe members. The invention of the first layer of coating of the ductile iron pipe members with an alloy of zinc-aluminium with other elements followed by a second layer of coating of paint made from modified natural resin of cashew nut shell liquid, results in an improved corrosion resistance.

Zinc-aluminium alloys have been in use for the coating of Dl pipes for some time now. Several types of coating has been developed using the zinc-aluminium with other elements for corrosion protection by various researchers. Research work by P. Choudhury and S. Das [1] states that ZA27 alloy, [Zinc, Aluminium (25.0-28.0%) with Cu (2.0-2.5%)], have high corrosion resistance. S. T. Vagge and V. S. Raja [2] carried out immersion corrosion tests to show that with the addition of Strontium (Sr 0.1%) the corrosion resistance is higher than ZA27 without Sr.

Komatsu et al [3] and Uranaka et al. [9] studied the corrosion resistance of hot dip galvanized sheets with Zn-6% Al-3% Mg alloy and exhibited better corrosion resistance than the post-Zn-coated material specimens, even in portions where the steel substrate was exposed.

Morimoto et al [4] developed Zn—Al—Mg—Si alloy called Super Dyma with a composition of Zn, 11% Al, 3% Mg and 0.2% Si. It was found that increase of Al, Mg content in coating and the addition of Si improved corrosion resistance in salt spray tests.

Various paints and coatings are available to be used as the final top coat on different iron and steel products currently. The external paint systems on various steel and cast iron pipes include—
a) two part liquid resin epoxy based paints,
b) water based acrylic paints,
c) water based resin epoxy paints,
d) polyurethane (PU) paints,
e) polyethylene (PE) coatings,
f) polypropylene (PP) coatings,
g) fusion bonded epoxy (FBE) coatings, and,
h) bitumen coating, All the above paints are synthetically produced and not from natural product. All these synthetic paints such as epoxy, PU, PE, PP, FBE are based on synthetic resin.

SUMMARY OF INVENTION

According to a first aspect of the present invention there is provided ductile iron pipe member for buried piping having an external coating provided thereon comprising a first layer formed of a pseudo metal alloy and applied over the said first layer a second layer based on an unique one made from a natural resin, CNSL (cashew nut shell liquid), wherein said first layer is formed of a pseudo alloy of Zinc and Aluminium and the second layer formed with a good corrosion resistant material Modified CNSL resin based paint contain 2-10% of anticorrosive pigment such as zinc phosphate, iron oxide etc. and hence this invention results in increased life of the ductile iron pipe from soil or ambient conditions.

As per another aspect of the present invention, the paint form a non-toxic film on drinking water pipe with improved acid, alkali resistant, better water repellence & anti-microbial, termite, insect resistance properties on aging. It has the characteristics to form hard & tough Dry Film Thickness at >70 microns by spray application.

An exemplary object of the present invention is to provide a pseudo alloy coating with any ratio of the alloying members along with a second layer of CNSL modified resin based paint which gives amazing effects to the piping member when coated upon.

Another exemplary object of the present invention is to provide a corrosion resistant, renewable and bioregenerative resin based paint on piping member which has improved corrosion resistant property as discussed in the prior patents but yet is economical, inexpensive, convenient, safe, and which is competitive. The paint has no Bisphenol-A (BPA) and low Volatile Organic Compound (VOC) which are harmful for health.

Yet another exemplary object of the present invention is to provide a method for coating the external surface of underground ductile cast iron piping members with Zinc-Aluminium pseudo alloy comprising the steps of: providing an uniform coating of a pseudo alloy of Zinc-Aluminium as first layer; providing an uniform coating of CNSL modified resin based paint as second layer; characterized in that the quantity of the pseudo-alloy deposited over the said pipes is at least 130 gm/m$^2$ (min) over the full external surface and the said resin is deposited >70 microns thickness.

As per another aspect of the present invention there is provided a method and system for the deposition of the pseudo alloy over the said piping member in order to have a uniform deposition of the pseudo Zn—Al alloy.

As per a preferred embodiment of the present invention the said method and arrangement provides an uniform coating of Al (6-30%) and Zn (balance) as first layer.

As per another embodiment of the present invention the coated ductile cast iron pipes are subjected to second layer of CNSL modified resin based paint which has excellent chemical stability, water resistant, chemical resistant and non-toxic properties. In addition, the said resin has excellent UV rays protection, salt spray, corrosion resistant properties on aging.

As per another aspect of the present invention the said method provides a cost effective and efficient solution with respect to the known methods of coating of ductile iron pipes and fittings.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF SUMMARY OF THE ACCOMPANYING ANNEXURES AND FIGURES

The patent or application file contains at least one drawing executed in color. Copies of this patent or patent application publication with color drawing(s) will be provided by the Office upon request and payment of the necessary fee.

To enable the invention to be fully understood, preferred embodiments will now be described with reference to the accompanying annexure/figures, in which:

FIG. 1(a) illustrates the Corrosion results obtained by salt spray tests on Bitumen coated pipes as per the prior art;

FIG. 1(b) illustrates the Corrosion results obtained by salt spray tests on CNSL modified resin based paint coated pipes in accordance with the present invention;

DETAILED DESCRIPTION

The present invention is directed to anti-corrosion Paint for drinking water pipes. The coatings of Zinc and Aluminium and other metals are used for corrosion protection in a big way. The other elements include at least one or more of the following elements such as 0-10% Copper, 0-10% Magnesium, 0-10% Strontium, 0-5% Silicon. The amount of the above elements is given by weight percentage. Thermally sprayed Zinc, Aluminium and other metal coating have been used in the past to offer corrosion protection to steel structures and more preferably to the Ductile iron pipes for many years now. There are instances for use of Zn—Al coating with prealloyed wire. The outermost layer of the DI pipes are modified with CNSL modified resin based paint which is a non toxic paint having a certain thickness. This paint is used for the outer layer of DI drinking water pipe.

The present invention also discloses a method for coating of ductile iron pipes with first layer of Zn—Al (Pseudo Alloy) with other metals and a second layer of CNSL modified resin based paint, wherein the coating demonstrates very tough corrosion resistance in NACE environment and Salt Spray environment containing chlorine, such as salt water.

CNSL modified resin based paint is an abundantly available, renewable and bioregenerative resin made from the cashew nut apple. CNSL resin has never been used in paints for ductile iron pipes and is a very good water repeller. The said CNSL resin is a good corrosion resistant material and increase the corrosion resistant property of the paint as well. Hence this invention results in increased life of the ductile iron pipe from soil or ambient conditions. The resin further has no Bisphenol A (BPA), which is supposed to be harmful for the health. This invention also has low VOC which is good for the environment.

Zinc

The use of Zinc for cathodic protection of steel has become increasingly popular, because of its galvanic power. It can protect steel from corrosion even in unprotected adjacent areas. Zinc allows for easier spraying and has better adherence to the steel substrate.

As a general rule, Zinc performs better in alkaline environments. But in certain environments, like salt water or chemical atmospheres, it is consumed as it cathodically protects metal on which it is applied, thereby increasing the protection of ductile iron by zinc. Also, Zinc cannot be applied to surfaces that exceed a working temperature of 140° F.

Aluminium

Aluminium has an advantage of being a lightweight metal, though it costs more than Zinc. Aluminium coatings function best where Zinc may rapidly fail, such as in salt water and chemical atmospheres. It also protects steel in temperatures exceeding 1000° F. The coating of Aluminium has good mechanical properties and good abrasion resistance under corrosive conditions. It can usually provide longer protection with its thickness equal to that of Zinc. Moreover, the material consumption of Aluminium is twice less than that of Zinc to obtain the coating in the same thickness.

However, there are certain disadvantages associated with Aluminium. There is more porosity and oxide in the coating. If it is not thick enough and a suitable sealing step is not included, rust spots appear on the coating which gives the coating surface an unattractive red spotty appearance.

Combination of Zinc and Aluminium and Other Metals

In view of above as described in texts with captions Zinc and Aluminium, coating with a combination of Zinc, Aluminium performs and other metals in controlled proportions like Copper, Magnesium, Strontium and Silicon provides better corrosion protection rather than that with Zinc or Aluminium individually.

An experimental study of electric arc spraying of Zinc/Aluminum alloy coatings demonstrates the suitability of the systems for anticorrosion applications. Experiments were conducted using Box type, fractional-factorial designs. The process parameters that were varied include nozzle diameter, current, spray distance, and system pressure. The experiments were designed to display the range of processing conditions and their effect on the coating. The coatings were characterized with bond strength and deposition efficiency tests and optical metallography. Coating characteristics were quantified with respect to roughness, porosity, thickness, bond strength, and microstructure. Performance evaluation of the coatings was quantified with accelerated corrosion testing. A parameter-property-performance relationship has been developed for each material system.

Thermally sprayed Zinc and Aluminium coatings have been used as sacrificial anodic coatings since many years to provide protection to steel structures. Coatings of Zinc and Aluminium are used extensively through two methods, namely, the twin wire arc spray system and the wire flame spray system. When two dissimilar wires are sprayed simultaneously in a twin wire arc spray system, a pseudo alloy structure is formed in the coating. Similarly, Aluminium and Zinc wires can be flame sprayed to form Zinc-Aluminium pseudo alloy coatings. There are also instances where wires, prealloyed with Zinc and Aluminium, are arc sprayed to get alloy coating.

The Zinc-Al coatings formed as a pseudo alloy of Zinc and Aluminium coating by the arc spray process provide enhanced corrosion protection of Ductile Iron piping member. Moreover, Zinc-Al coatings offer a clean and economical way of protecting Ductile Iron piping member from corrosion. Arc spraying used, as part of the process does not cause any distortion of the substrate. Moreover, the Pseudo Zinc-Al process does not use the costly alloy wire of Zinc Aluminium. Instead pure Zinc and Aluminium wires can be utilized separately which costs less and provide versatility of the alloy composition. This is quite advantageous as the earlier mentioned Zinc-Aluminium alloy wire coating has certain limitations in comparison to Pseudo Zinc-Al coatings. For instance, the alloy wire has to be manufactured with a fixed ratio and separate premanufactured wires are to be made available for separate ratios, as and when required. Moreover, when Aluminium content in the prealloyed wire is more than 15%, there is a tendency of developing brittleness in the alloyed wire making it all the more difficult in wire drawing during arc spraying. In contrast, the disclosed coatings can be prepared with much desirous and regulated content of Aluminium depending upon the nature of the end use. As a result desired and effective corrosion resistance can be achieved with preset Zn/Al ratio in the disclosed coating process, using only a single type of Zinc and Aluminium wire.

After the application of the pseudo alloy layer the piping members are coated with CNSL modified resin based paint will have no Bisphenol A (BPA), which is supposed to be harmful for the health. This invention also has low VOC which is good for the environment. The paint coating not only seals the pores [leak] of the first layer of the metallic pseudo alloy coating but also creates a barrier coating over the first layer. The application process of the second layer of paint coating ensures formation of limited pores on the coating to restrict its disbonding from the substrate. CNSL modified resin based coating system provides high corrosion resistance property, which is a natural resin based, has no health hazard and contains low VOC. Paint coatings are characterized by their durability, strength, adhesion and chemical resistance, making them an ideal product for their application as a barrier coating and leak sealant.

The second layer of coating is based on CNSL modified resin based paint for drinking water pipeline for external coating system. The second layer is of a single layer of modified CNSL converted into a modified paint and/or emulsified water reducible paint. The paint is absolutely BPA free, natural resin based with very low percentage of solvent which gets evaporated during film formation on the surface. The paint has low fade characteristic for friction, low fading in UV light, good electrical resistance, better water repellence, with improved acid & alkali resistance as shown in comparison FIGS. 1(a) and (b) also. In addition, the CNSL modified resin based paint has antimicrobial, termite and insect resistance properties on aging.

Therefore the present disclosure also provide a method for applying Zinc-Aluminium with or without other elements such as Strontium, Magnesium, Silicon, and Copper, pseudo alloy for the outside of underground ductile cast iron piping members comprising the steps of: providing an uniform coating of a pseudo alloy of Zinc-Aluminium as first layer; and thereafter providing an uniform coating of CNSL modified resin based paint as second layer; wherein the quantity of the pseudo-alloy deposited over the said pipes is at least 130 gm/m$^2$ (min) over the full external surface. The second layer has coating thickness (Dry Film Thickness) of 70-100 microns. Multiple coatings of CNSL modified resin based paint increases the corrosion resistance and water repellent properties.

The basic composition of CNSL modified resin based paint which is being used for second layer on Zinc coated piping members is modified CNSL resin 50-60% and/or 20-25% demineralised (DM) water, 5-25% inorganic and organic pigment such as titanium dioxide, copper pthalocyanine, iron oxide black or the combination of two or more. CNSL modified resin based paint contain 2-10% of anticorrosive pigment such as zinc phosphate, iron oxide etc. It also contains 10-30% of at least one filler such as silica powder, talc, or a combination of the above. The CNSL modified resin based paint further contains 1-10% different type of additive for anti-sagging, silicon free anti-foaming agent, dispersing and anti-settling agent.

The CNSL resin as used herein is a renewable source of raw material from cashew apple of the cashew nut, there is no toxicity in the CNSL resin based paint, has no harmful Bisphenol A, and also has low amount of VOC (volatile organic compounds). The taste and odour characteristic of the CNSL modified resin based paint passes the characteristic as per the national standards for health and hygiene and characterized by the color characteristics of the CNSL resin and has been modified to have many colors.

The system is configured for uniform coating of a pseudo alloy of Zinc-Aluminium as first layer, thereafter an uniform coating of CNSL modified resin based paint is applied as second layer for the said piping member wherein the density of the pseudo-alloy deposited over the said pipes is at least 130 gm/m$^2$ (min) and up to 500 gm/m$^2$ over the full external surface. These coatings are capable of providing effective long-term corrosion protection to the ductile cast iron structures of any size in a wide range of land and marine environments. Such coatings, when properly sealed or painted, have the potential to significantly reduce the maintenance requirements for a wide range of applications. Further, all arrangements are installed on line such that quality and productivity is ensured during production.

FIG. 1(b) shows data on Corrosion Rate on coating with Zinc, Zn—Al (Pseudo) and Zn—Al (Alloy), along with CNSL modified resin based paint coated as a second layer and the said data is derived from salt spray analysis. In the test piece all sides of the specimens (25 mm×25 mm×1 mm thick), were coated with non-conducting lacquer. These specimens were weighed and subjected to salt spray mist formation inside a designed spray cabinet. Volume of liquid of 5% NaCl inside the cabinet was maintained at 50 liters. The liquid flow rate to mist formation and temperature (23° C.) close to rest specimens were maintained. The specimens were withdrawn every 100 hrs, washed clean, dried and weighed (mgs). The lacquered surfaces are re-lacquered, then weighed and salt spray test continued.

Results

| ELECTROENAMEL BLUE RAL 5020 | | |
|---|---|---|
| Sl. No. | Test Parameter | Result |
| 1 | Salt Spray (500 Hrs.) | OK(ASTM B 117) |
| 2 | QUV (100 Hrs.) | OK (ΔE = 3.10) |
| 3 | DFT | (70-80)μm |
| 4 | Gloss @60° C. | 30-35 |
| 5 | Volume Solid | (45-50)% |
| 6 | VOC | 100 gm/lt |
| 7 | Presence of BPA | Nil |
| 8 | Viscosity @30° C./FC4 | (100-120) Sec |
| 9 | Specific Gravity | 1.30 +/− 0.02 |
| 10 | Adhesion Test(Cross Cut Tester) | Satisfactory |
| 11 | Flexibility (¼ inch Conical Mandrel) | Passes |
| 12 | Pull Off Test | Passes 7 MPa (ASTM D 4541) |
| 13 | Acid Resistance (1% Hcl) | 400 Hrs |

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

The invention claimed is:

1. An improved corrosion resistant buried underground ductile cast iron piping members with an external coating, said coating comprising of:
    an uniform coating of a pseudo alloy of Zinc-Aluminium and other metals as first layer;
    an uniform coating of CNSL (cashew nut shell liquid) modified resin based paint as second layer;
    wherein the quantity of the pseudo-alloy deposited over the said pipes is at least 130 gm/m$^2$ (min) over the full external surface.

2. An improved corrosion resistant buried underground ductile cast iron piping members with an external coating as claimed in claim 1, wherein the said second layer has coating thickness (Dry Film Thickness) of >70 microns.

3. An improved corrosion resistant buried underground ductile cast iron piping members with an external coating as claimed in claim 1, wherein the said composition of CNSL modified resin based paint consist of CNSL resin 50-60% and/or 20-25% demineralised (DM) water, 5-25% inorganic and organic pigment such as titanium dioxide, copper pthalocyanine, iron oxide black or the combination of two or more.

4. An improved corrosion resistant buried underground ductile cast iron piping members with an external coating as claimed in claim 1, wherein the CNSL modified resin based paint contain 2-10% of anticorrosive pigment such as zinc phosphate, iron oxide etc.

5. An improved corrosion resistant buried underground ductile cast iron piping members with an external coating as claimed in claim 1, wherein the CNSL modified resin based paint contains 10-30% of at least one filler such as silica powder, talc, or a combination of the above.

6. An improved corrosion resistant buried underground ductile cast iron piping members with an external coating as claimed in claim 1, wherein the CNSL modified resin based paint contains 1-10% different type of additive for anti-sagging, silicon free anti-foaming agent, dispersing and anti-settling agent, it is specified that the contents of the above include bentonite powder (anti-sagging agent) 1-2%, Silicone free (antifoaming) additive 0.20-0.50%, polymeric dispersion agent 0.20-0.50%, fumed silica (anti settling agent) 0.20-0.50%.

7. An improved corrosion resistant buried underground ductile cast iron piping members with an external coating as claimed in claim 1, wherein the CNSL resin is non toxic and contains no harmful Bisphenol A, and also has low amount of VOC (volatile organic compounds), it is specified that the contents of the above include Bentonite Powder (Ant sagging) –1-2%, Silicone free anti foam additive–0.20-0.50%, polymeric dispersion agent–0.20-0.50%, ant settling agent (fumed silica)–0.20-1.0%, emulsifier –0.50-1.0%, Water –15-20%.

8. An improved corrosion resistant buried underground ductile cast iron piping members with an external coating as claimed in claim 1, wherein the CNSL resin based paint possesses the characteristic as per the national standards for health and hygiene.

9. An improved corrosion resistant buried underground ductile cast iron piping members with an external coating as claimed in claim 1, wherein the CNSL modified resin based paint is changed to have many colors such as black, blue, red, green and the like.

10. An improved corrosion resistant buried underground ductile cast iron piping members with an external coating as claimed in claim 1, wherein the said pseudo alloy comprises of Zn-60-90%, Al-10-40%, and at least one of the following alloying elements such as Cu-0.2-8%, Mg-0.2-5%, Si-0.1-3.0%, Sr-0.02-1.0%.

11. An improved corrosion resistant buried underground ductile cast iron piping members with an external coating as claimed in claim 1, wherein the said pseudo alloy coating is carried out by electric arc spraying.

12. An improved corrosion resistant buried underground ductile cast iron piping members with an external coating as claimed in claim 1, wherein the second layer coating is carried out by spraying.

13. An improved corrosion resistant buried underground ductile cast iron piping members with an external coating as claimed in claim 1, wherein the quantity of the pseudo-alloy deposited over the said pipes is up to 500 gm/m$^2$ over the full external surface.

14. A method for applying Zinc-Aluminium pseudo alloy for the outside of underground ductile cast iron piping members comprising the steps of:
   providing an uniform coating of a pseudo alloy of Zinc-Aluminium as first layer;
   providing an uniform coating of CNSL modified resin based paint as second layer;
   wherein the quantity of the pseudo-alloy deposited over the said pipes is at least 130 gm/m$^2$ over the full external surface.

15. A method for applying Zinc-Aluminium pseudo alloy for the outside of underground ductile cast iron piping members as claimed in claim 14, wherein the CNSL modified resin based paint contains 10-30% of at least one filler such as silica powder, talc, or a combination of the above.

16. A method for applying Zinc-Aluminium pseudo alloy for the outside of underground ductile cast iron piping members as claimed in claim 14, wherein the said second layer has coating thickness (Dry Film Thickness) of >70 microns.

17. A method for applying Zinc-Aluminium pseudo alloy for the outside of underground ductile cast iron piping members as claimed in claim 16, wherein the CNSL modified resin based paint contains 1-10% different type of additive for anti-sagging, silicon free anti-foaming agent, dispersing and anti-settling agent.

18. A method for applying Zinc-Aluminium pseudo alloy for the outside of underground ductile cast iron piping members as claimed in claim 16, wherein the CNSL resin is non toxic and contains no harmful Bisphenol A, and also has low amount of VOC (volatile organic compounds) as given in claim 7.

19. A method for applying Zinc-Aluminium pseudo alloy for the outside of underground ductile cast iron piping members as claimed in claim 16, wherein the said pseudo alloy comprises of Zn-60-90%, Al-10-40%, and at least one of the following alloying elements such as Cu-0.2-8%, Mg-0.2-5%, Si-0.1-3, Sr-0.02-0.05.

20. A method for applying Zinc-Aluminium pseudo alloy for the outside of underground ductile cast iron piping members as claimed in claim 16, wherein the said pseudo alloy coating is carried out by electric arc spraying.

21. A method for applying Zinc-Aluminium pseudo alloy for the outside of underground ductile cast iron piping members as claimed in claim 16, wherein the second layer coating is carried out by spraying.

22. A method for applying Zinc-Aluminium pseudo alloy for the outside of underground ductile cast iron piping members as claimed in claim 16, wherein the quantity of the pseudo-alloy deposited over the said pipes is up to 500 gm/m$^2$ over the full external surface.

23. A method for applying pseudo alloy of Zn—Al and other metals, for the outside of underground ductile cast iron piping members as claimed in claim 14, wherein the said composition of CNSL modified resin based paint consist of CNSL resin 50-60% and/or 20-25% demineralised (DM) water, 5-25% inorganic and organic pigment such as titanium dioxide, copper pthalocyanine, iron oxide black or the combination of two or more.

24. A method for applying Zinc-Aluminium pseudo alloy for the outside of underground ductile cast iron piping members as claimed in claim 23, wherein the CNSL modified resin based paint contain 2-10% of anticorrosive pigment such as zinc phosphate, iron oxide etc.

* * * * *